UNITED STATES PATENT OFFICE.

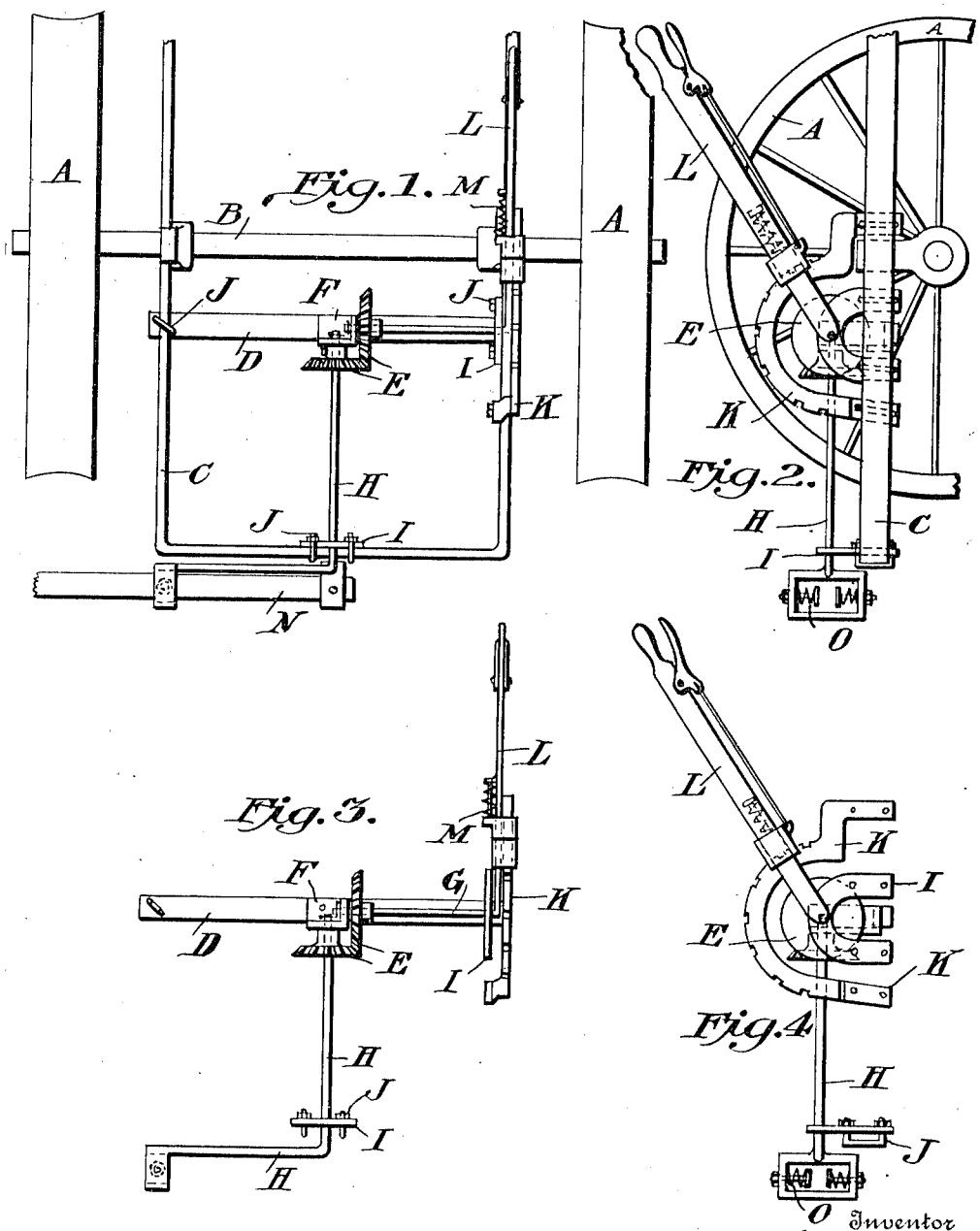

ALFRED J. GREENE, OF MONROVIA, MARYLAND.

MARKER FOR CORN-PLANTERS.

1,072,447.  Specification of Letters Patent.  Patented Sept. 9, 1913.

Application filed July 23, 1912. Serial No. 711,114.

*To all whom it may concern:*

Be it known that I, ALFRED J. GREENE, a citizen of the United States, residing at Monrovia, county of Frederick, and State of Maryland, have invented certain new and useful Improvements in Markers for Corn-Planters, of which the following is a specification.

This invention relates to markers for corn planters.

The present invention has for its object to obviate the inconvenience experienced in turning the ordinary marker from one side of the planter to the other when turning the corn planter at the end of the row and to this end I provide a simple, inexpensive and strong and durable marker and operating means therefor, all of novel construction and adapted to be attached with facility to the frame of any ordinary corn planter and to enable the marker to be quickly and easily raised and locked while the planter is turning at the end of the row and turned over to the other side when the machine has been turned around to resume planting.

The invention consists, first, of operating means of novel construction for shifting the marker bar and, second, of an improved connection between the operating means and the marker bar itself as will appear more fully hereinafter.

In the accompanying drawings:—Figure 1 is a plan view showing the invention in use on a corn planter; Fig. 2, a side elevation, the marker bar being omitted; Fig. 3, a plan view of the invention by itself, the marker bar being omitted; and Fig. 4, a side elevation of Fig. 3.

The wheels of an ordinary corn planter are shown at A, the axle at B and the frame at C.

To enable my invention to be readily attached to the frame C, I provide a cross bar D which is secured to the frame by U-bolts J embracing the latter and carries at its central part an angled bearing plate or member F riveted or bolted thereto. Connected by U-bolts J to the frame C is an arch I. A ratchet segment K is similarly connected to frame C. Journaled in the arch I and the plate F is a shaft G which carries a beveled gear E. Welded or suitably secured to the shaft G is a lever L having any suitable or preferred latch mechanism M adapted to lock it to the comb or rack K. Secured to the rear of the frame C by U-bolts J is an arch I. Journaled in the arch I and in the plate F is a shaft H carrying a bevel gear E meshing with the gear E first-named. The shaft H is preferably formed integral with an angular part which is provided with a loop receiving the marker bar N, the latter being secured to the usual pivoted member on the frame C so that it may swing from side to side of the machine. To prevent jerking or binding of the angled part of shaft H and its loop or box on the marker bar N, the latter is provided with spring cushioned pressure members O, the marker bar being smaller than the loop and these spring pressure members bearing upon opposite sides of said marker bar. The members O are bolts having enlarged heads or plates at their inner ends and provided with nuts on their outer ends, the shanks of the bolts being surrounded by springs which force the pressure members inwardly into yielding engagement with opposite sides of the marker bar.

When the end of the row is reached and it is desired to plant another row, instead of having to raise the marker bar and hold it by hand while turning the machine, the driver moves the lever L into upright position, whereupon the shafts G and H and the bevel gears E swing the marker bar N into upright position and the latch M locks it until the machine has turned around. Bringing the lever L to a position opposite that which is originally assumed, causes the marker bar to be swung over to the opposite side of the machine and locked in that position. The marker bar N being pivotally mounted, the loop on the shaft H slides along the marker bar as the latter is swung, without any binding or jerking by reason of the employment of the pressure members O which cushion all movements and relieve the parts of strain.

Having thus described my invention, what I claim as new and desire to secure by Letters Patent, is:—

1. The combination with a swinging marker bar, of a rock shaft having a spring cushioned operative connection with the marker bar, and means for turning the rock shaft.

2. The combination with a swinging marker bar, of a rock shaft having an arm or part provided with a member loosely receiving the marker bar, yieldable means carried by the member and bearing on the marker bar, and means for turning the rock shaft.

In testimony whereof, I hereunto affix my signature in presence of two witnesses.

ALFRED J. GREENE.

Witnesses:
GEO. B. PETTS,
JOHN S. BARKER.

Copies of this patent may be obtained for five cents each, by addressing the "Commissioner of Patents, Washington, D. C."